United States Patent [19]

Giroux

[11] 4,230,533

[45] Oct. 28, 1980

[54] FRACTIONATION METHOD AND APPARATUS

[75] Inventor: Victor A. Giroux, Bartlesville, Okla.

[73] Assignee: Phillips Petroleum Company, Bartlesville, Okla.

[21] Appl. No.: 917,046

[22] Filed: Jun. 19, 1978

[51] Int. Cl.² ............................................. B01D 3/42
[52] U.S. Cl. ........................................... 203/1; 203/3; 203/98; 203/DIG. 18; 203/DIG. 19; 202/158; 202/162; 202/181; 196/132; 208/DIG. 1; 261/114 R; 261/148
[58] Field of Search .................. 203/1, 2, 3, DIG. 18, 203/99, 98, DIG. 9, DIG. 19; 202/160, 181, 158, 206, 162; 196/132, 100, 105, 139; 261/113, 114 R, 148; 208/DIG. 1

[56] References Cited

U.S. PATENT DOCUMENTS

| | | |
|---|---|---|
| 2,134,882 | 11/1938 | Monro . |
| 2,471,134 | 5/1949 | Wright ............................ 202/158 X |
| 3,053,521 | 9/1962 | Plaster et al. ................. 202/158 X |
| 3,314,879 | 4/1967 | Lacy et al. . |
| 3,322,650 | 5/1967 | Hillburn .................................. 203/1 |
| 3,412,016 | 11/1968 | Graven . |

Primary Examiner—Wilbur L. Bascomb, Jr.

[57] ABSTRACT

A fractionation column is provided with a feed inlet and three product outlets, with the product outlets including an overhead vapor outlet, a bottoms liquid outlet and a side draw outlet. A plurality of vertically spaced apart vapor-liquid contact trays are mounted in the column. A generally vertical partition is positioned within the column in a central region between an upper and a lower vapor-liquid contact tray and divides the central region into first and second chambers defined by the upper and lower trays, column shell and partition. The feed inlet opens into the first chamber while the side draw outlet opens into the second chamber. First control means is provided for controlling the various inputs and outputs of the column. Second control means is also provided for measuring various constituent portions of fluid mixtures within the column. Third control means controls the relative vapor flow rates between the bottom portions of the first and second chambers and the region of the column below the partition. Fourth control means is also provided for measuring a constituent of a fluid mixture in the upper region of the first chamber and controlling liquid flow to the top of the first and second chambers from a region of the column above the partition.

16 Claims, 2 Drawing Figures

FRACTIONATION METHOD AND APPARATUS

The present invention relates to a fractionation column and method of operation thereof. In a specific aspect, the invention relates to a fractionation column adapted for the separation of a mixture containing at least three components of different boiling points, at least a portion of one component being taken as an overhead product, at least a portion of a second component being taken off as a bottoms product and at least a portion of a third component being taken off as a side product. The fractionation column has a central portion thereof divided into two chambers by a vertical partition.

In fractionation it is sometimes desirable to separate a feedstream containing a plurality of components or constituents into three component portions or fractions. When the component fractions have sufficiently different boiling points, this can be readily accomplished as is known in the art by the use of two or more fractionating columns connected in series. However, the use of a plurality of columns necessitates the use of a corresponding number of reboilers, condensers and control equipment plus the piping to interconnect the two columns in series. Such apparatus has been used with a satisfactory degree of success.

It has also been proposed in the art to use a single column which has a partition disposed generally vertically within the column to effect the separation of three constituent fractions. Such an apparatus is disclosed in U.S. Pat. No. 2,471,134, issued July 17, 1946.

The present invention provides a fractionation column which is an improvement over those known in the art. A feedstream containing three or more components can be separated into three component portions effectively and efficiently in one column. The apparatus and method are particularly well adapted for use with a feedstream containing components which have relatively close boiling points and still provide relatively pure product streams of three fractions or components. The column of the present invention also includes control means which is operable for controlling flows of various portions of the components from one region of the column to another region of the column to thereby more closely control the operation of the column and improve the purity of the product streams. Also, the column is constructed such that the partition physically separates a central region of the column into two distinct chambers. The partition cooperates with structural elements in the column in a manner such that portions of fluid mixtures from one chamber do not pass into the other chamber without first being fractionated thereby improving the purity of the product streams.

An object of the invention is to provide a fractionation column capable of separating a feedstream containing at least three components of different boiling points into at least three component product streams. Another object is to provide such a fractionation column with control means for controlling fluid flows from one region of the column to another region of the column to enhance the purity of the components taken off a products. A further object is to provide a fractionation column which has a central region thereof separated into two chambers by a generally vertically disposed partition which has at least one vapor liquid contact tray beyond each end of the partition. A still further object is to provide a fractionation column which is well adapted for its intended use and economical to operate.

Other objects and advantages of the present invention will become apparent from the following detailed description taken in connection with the accompanying drawings wherein are set forth by way of illustration and example certain embodiments of the present invention.

Figure 1:
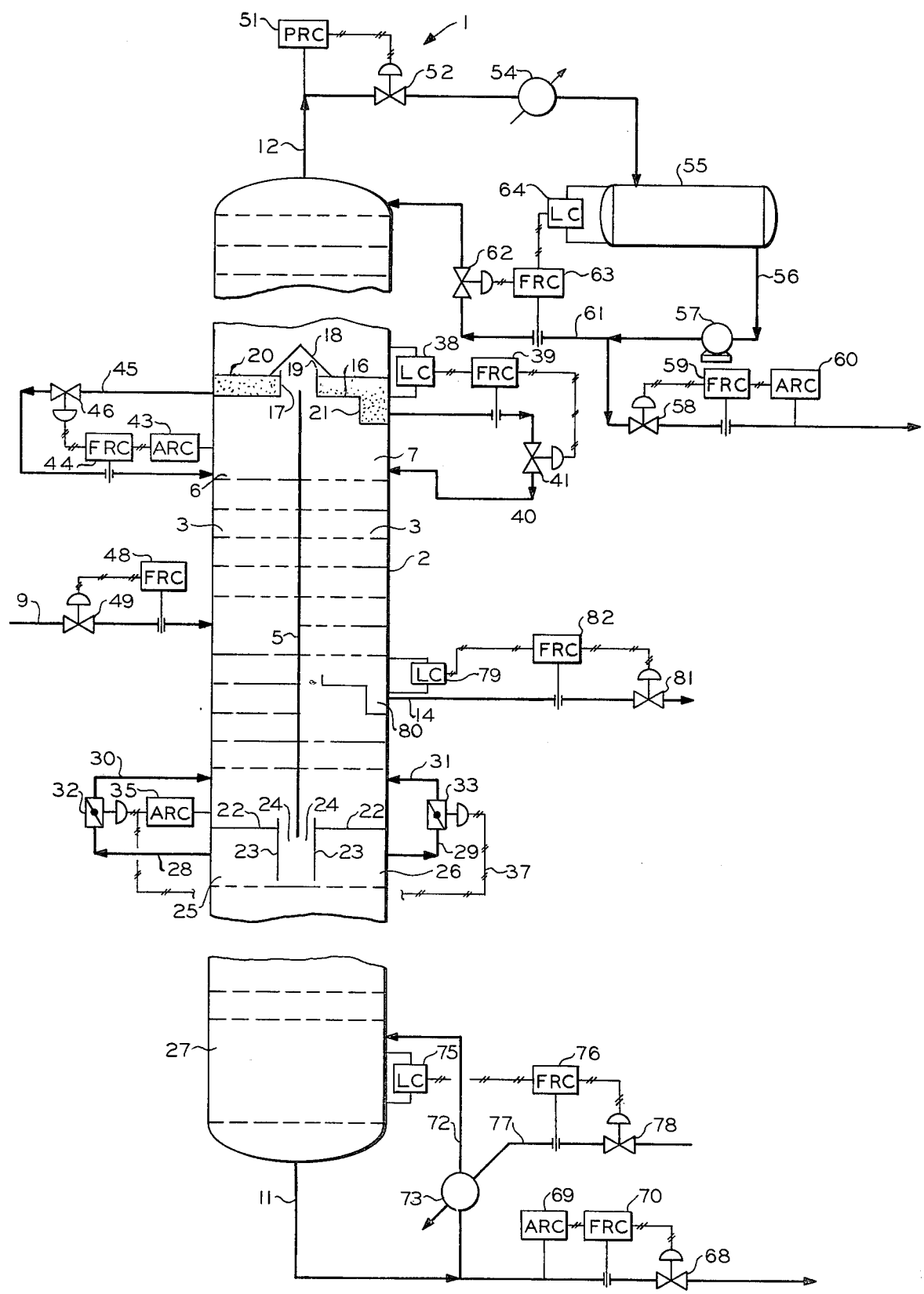
FIG. 1 is a schematic illustration of a fractionation column.

The reference numeral 1 designates generally a fractionation apparatus. The apparatus 1 includes a fractionation column 2 which has its longitudinal axis disposed generally vertically, has a plurality of vertically spaced apart, generally horizontally disposed vapor/liquid contact trays 3 secured therein. A generally vertically disposed, preferably imperforate, partition 5 is secured within the interior of the column 2 in a central region thereof. The partition 5 extends between and is secured to opposite sides of the column 2 having trays 3 on opposite sides thereof. The partition 5 divides the central region of the column 2 into first and second chambers or zones 6 and 7. A feedstream inlet conduit means 9 opens into the column 2 in the first zone 6 in a central region of the column 2. At least three outlet means open into the column 2. The outlet means include a bottoms liquid outlet conduit means 11, an overhead vapor outlet conduit means 12 opening into an upper portion of the column 2 and a side draw outlet conduit means 14 opening into the second zone 7 and operable for discharge of fluid from the second zone 7.

The trays 3 can be of any suitable type such as those known in the art operable for effecting vapor-liquid contact. The top of the partition 5 is positioned below an upper disposed tray 3 and the bottom of the partition 5 is positioned above a lower disposed tray 3. The trays 3 are positioned through a substantial height of the column and are in any suitable quantity. In the illustrated structure, the partition 5 has trays 3 positioned on opposite sides thereof. There is also provided in the column a liquid reservoir forming member 16 positioned adjacent to or at the upper end of the partition 5. Preferably the member 16 has a hollow tubular portion 17 which forms a chimney which has a cover 18 thereover and spaced from the chimney 17 forming a vapor flow opening 19 therebetween. The chimney 17 projects upwardly from the member 16 and with the member 16 being secured to the side wall of the column 2 a reservoir 20, preferably circumscribing the chimney 17, for the storage of liquid is formed. As illustrated in FIG. 1, the member 16 has a portion thereof forming a liquid well 21 extending downwardly from the remaining portion of the member 16.

A lower portion of the column adjacent the bottom end of the partition 5 is provided with vapor and liquid collecting chamber or zone forming means. In the form shown in FIG. 1 imperforate weir plates 22 are secured within the column 2 on opposite sides of the partition 5 and are spaced therefrom. Downcomer forming plates 23 extend downwardly from the weir plates 22 in spaced apart relation and on opposite sides of the partition 5. The weir plates 22 are generally horizontally disposed while the members 23 are generally vertically disposed. The members 23 extend upwardly beyond the weir plates 22 and form a dam such that liquid can collect on the weir plates 22. The lower disposed ends of the members 23 are positioned above a lower adjacent tray 3 such that liquid flowing downwardly through the downcomers 24 defined by the members 23 can flow onto the below adjacent tray for liquid/vapor contact. The tray 3 immediately below downcomers 24, the column 2 and weir plates 22 and their respective downcomer members 23 cooperate to form respective vapor collecting chambers or zones 25 and 26. The chambers 25 and 26 are separated flowwise from one another by liquid on the tray 3 immediately below downcomer 24. Preferably, the tray 3 immediately below the members 23 is imperforate in the region below the downcomer 24 such that liquid flowing downwardly through the downcomer 24 will be dispersed on the remaining perforate area of the tray 3.

Vapor by-pass conduit means is provided for each of the chambers 25 and 26. By-pass conduit means 28 communicates between the chamber 25 and the lower portion of the first chamber 6 and is operable for controlling the flow of vapor from chamber 25 to the first chamber 6. By-pass conduit means 29 forms a vapor flow path between chamber 26 and the lower portion of the second chamber 7 selectively permitting vapor in chamber 26 to flow to the second chamber 7. The vapor collected in the chambers 25 and 26 comes from the stripping chamber or zone 27 by reboiling the bottoms of the column 3. The conduit means 28 and 29 include conduits 30 and 31, respectively, each of which have one end opening into the respective chamber 25 or 26 and the other end opening into the respective chamber 6 or 7. There is connected in the conduits 30 and 31 flow control valves 32 and 33, respectively. Manipulation of the control valves 32 and 33 controls the relative vapor flows between the bottom or lower portions of the first and second chambers 6 and 7, respectively.

Control means is provided for controlling the operation of the valves 32 and 33. In the illustrated structure the control means includes an analyzer controller 35, such as a chromatographic analyzer as is known in the art, and its associated recorder/controller. The analyzer controller 35 measures and provides a signal representative of the concentration of the light key component in the fluid in a lower portion of the zone 6 adjacent zone 25 and produces a control signal responsive to the concentration of said light constituent. This control signal produced is transmitted to the valves 32 and 33 such as by having the analyzer controller 35 operably connected to the diaphragms of valves 32 and 33 via pneumatic control line 37. The valves 32 and 33 operate in response to the thus produced control signal to regulate the flow of vapor from the respective chambers 25 and 26 to the respective chambers 6 and 7 thereby manipulating the vapor flow rates. It is to be noted that a flow recorder/controller (not shown) can be connected in each of the conduits 30 and 31 and be operable to receive the signal from the analyzer 35 and thereby regulate the vapor flow rates by controlling the valves 32 and 33.

Liquid flow from the reservoir 20 is also suitably controlled. In the illustrated structure, a level sensor and controller 38 is operably connected to the column 2 to measure the level of liquid in the reservoir 20. A signal responsive to the difference between the measured liquid level and the desired liquid level is produced and transmitted to a flow controller 39 to serve as the setpoint thereto. The flow controller 39 is operably connected to the diaphragm operating valve 41 in conduit 40 which has one end opening into the reservoir 20 preferably at the well 21 and the other end opening into the chamber 7 to direct liquid flow onto the top tray of chamber 7. Flow controller 39 thus manipulates the valve 41 to regulate the flow of liquid from the reservoir 20 to the chamber 7 thereby maintaining the level of liquid within the reservoir 20 at least substantially at the desired value therefor. Also as illustrated an analyzer controller 43 is operably connected to the column 2 to sample the vapor above the top tray in chamber 6 and is operable for measuring and controlling the concentration of the heavy key component. The analyzer portion of 43 can be of any suitable type such as a chromatographic analyzer and is associated with a recorder controller. The analyzer controller 43 produces a control signal responsive to the difference between the measured and desired values of concentration of the heavy key component, which signal is then transmitted to a flow controller 44 to manipulate the setpoint thereof. The controller 44 is operably connected to the diaphragm of control valve 46 in conduit 45 which has one end opening into the reservoir 20 and the other end opening into a region above the top tray 3 of chamber 6. The controller 44 thus regulates fluid flow rate through the conduit 45 in response to its analysis. This regulates the concentration of heavy key component in the vapor leaving the top tray 3 in chamber 6 by controlling the flow rate of liquid available for contacting the vapor in chamber 6.

The feed inlet 9 as shown includes a flow recorder controller 48 operably connected to the inlet conduit 9 for sensing the input flow rate therethrough. The controller 48 is also operably connected to a flow control valve 49 connected in the inlet conduit 9 and is operable for controlling the input rate of the feedstream to the column 2. The overhead vapor conduit 12 has operably connected thereto a pressure recorder controller 51 which is connected to a valve 52 and is operable for controlling the column pressure. A condenser 54 is connected in the outlet conduit 12 and is operable for condensing the discharged overhead vapor. The condensate is collected in a reflux accumulator tank 55 which has an outlet conduit 56 with a pump 57 connected therein for pressurizing the condensed liquid. The outlet 56 also has connected therein a valve 58 which is operably connected to a flow recorder controller 59. The controller 59 senses and controls the flow rate of product through the valve 58. An analyzer controller 60 of any suitable type, such as a chromatographic analyzer recorder controller, is operably connected to the flow recorder controller 59. The setpoint of flow recorder controller 59 is manipulated by the control signal from analyzer controller 60 responsive to its setpoint to control the valve 58 and thereby regulate the discharge of liquid overhead product of desired purity through the valve 58. A reflux return conduit 61 is connected to the discharge 56 upstream of the valve 58 and also communicates with an upper region of the column 2. A valve 62 is connected in the conduit 61. A flow recorder/controller 63 is operably connected to the conduit 61 and to the valve 62 and is operable to sense the rate of flow and to provide a control signal to regulate the rate of reflux flowing through the conduit 61. A level controller 64 is operably connected to the tank 55 to sense liquid level and to provide a control signal responsive to the liquid level therein. The level controller 64 thus is operable to manipulate the set point of flow recorder controller 63 which regulates the flow of reflux through valve 62 to maintain the desired level in accumulator 55.

The bottoms outlet conduit 11 has connected therein a discharge flow control valve 68. An analyzer recorder/controller 69 and a flow recorder controller 70 are operably connected to the outlet conduit 11 for measuring and controlling the flow rate through the outlet conduit 11 based upon heavy key component concentration in the fluid sample as determined by analyzer/controller 69 and the desired value thereof. The analyzer/controller output signal manipulates the setpoint of flow recorder controller 70, in known cascade control manner, which in turn transmits a signal to the valve 68 to regulate the flow rate of the discharged product so as to achieve the composition setpoint to controller 69. A conduit 72 is connected to the discharge conduit 11 and to the stripping chamber 27 of the column 2 below the bottom tray 3 of column 2. The conduit 72 has connected therein a reboiler 73 operable for heating and vaporizing at least a portion of the bottoms material returning this at-least-partially-vaporized stream to the stripping chamber 27. This heat input to bottoms material provides the stripping vapor to separate the more volatile components from the bottoms and to effect fractionation in column 2.

In the illustrated structure, a level controller 75 is operably connected to the bottom region of the column 2 and is operable for sensing and controlling the level of liquid therein. The level controller 75 produces a control signal responsive to the difference between the measured level of liquid and its desired (setpoint) value, which is transmitted to manipulate the setpoint of flow recorder/controller 76. The flow recorder/controller 76 is operably connected to a heat source medium conduit 77, such as steam or the like, to sense and receive a signal representative of the flow rate of the heating medium through the conduit 77. The flow recorder controller 76 produces a control signal responsive to the difference between the setpoint signal from the level controller 75 and the flow rate measurement signal and transmits this signal to operate flow control valve 78 in the conduit 77. The valve 78 is operable for controlling the flow rate of the heating medium and thereby the rate of heat input to the bottom of the column 2.

The side draw outlet conduit 14 is connected to the central region of the column 2 and opens into the chamber 7. The vertical tray location of the outlet conduit 14 can be changed in accordance with the particular components being processed in the column 2 and the desired intermediate component. The outlet conduit 14 is laterally spaced across the column from the inlet conduit 9 and is on the opposite side of the partition 5. A level controller 79 is connected to column 2 at the outlet conduit 14 and is operable for controlling the level of the components in a reservoir portion 80 of a tray 3. Any suitable type of controller 79 can be used. The controller 79 produces a control signal responsive to the level of the intermediate component in the reservoir 80 and its desired (setpoint) value and is employed to manipulate the setpoint of flow controller 82. A flow control valve 81 is connected in the conduit 14. The flow recorder/controller 82 is connected in the conduit 14 and is operable for sensing the flow rate and producing a control signal responsive to the difference between the measured flow rate and the desired (setpoint) value thereof of the stream being discharged via the conduit 14 by the flow control valve 81.

Figure 2:
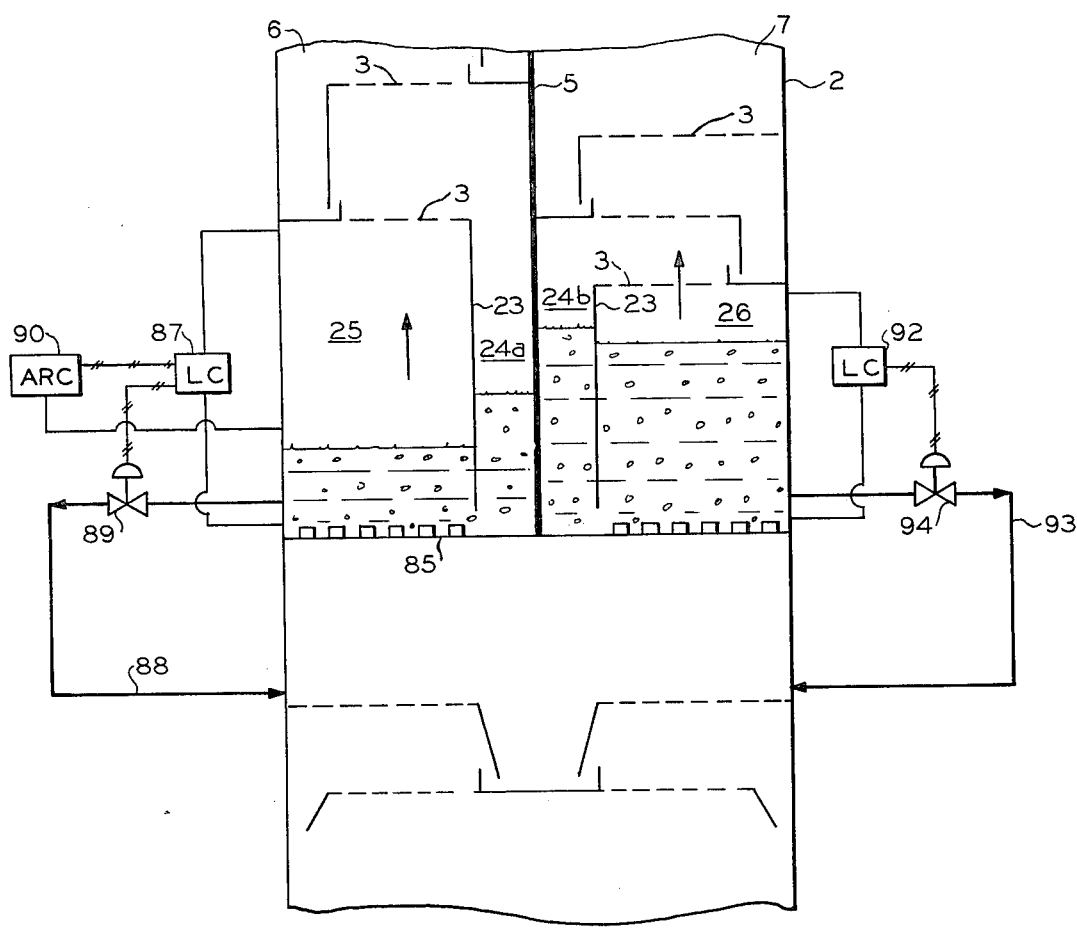
FIG. 2 is a fragmentary schematic illustration of a modified form of the fractionation column illustrated in FIG. 1.

FIG. 2 illustrates a modified form of the present invention wherein like numerals designate generally the same parts or structure as the numerals designate in the form of the invention illustrated in FIG. 1. As shown, the partition 5 terminates at a bubble tray 85 which extends across the column. The partition 5 forms a barrier between the two downcomers 24a and 24b. The trays 3 immediately above the tray 85 are perforate. Preferably the tray 85 is imperforate in the area below the downcomers 24a and 24b and is perforate in the area below the respective chambers 25 and 26. The members 23 are secured to and extend downwardly from the respective tray 3 having the lower end thereof spaced above the tray 85 forming flow openings between respective downcomers 24a and 24b with respective chambers 25 and 26. Control means is provided for controlling the relative amounts of vapor which can pass upwardly through the two sides of bubble tray 85 and into the central region of the column 2. It is preferred that the control means be such that the amount of vapor passing upwardly into the chambers 6 and 7 can be individually and simultaneously controlled. In the illustrated structure a level sensor/controller 87 is operably connected to the column 2 to sense the level of liquid in chamber 25 and to produce a control signal to operate valve 89. A conduit 88 opens into chamber 25 and discharges into the column below the tray 85 providing a liquid downflow conduit. An analyzer controller 90, such as a chromatographic analyzer and its associated recorder/controller is operably connected to chamber 25 and, upon analyzing the withdrawn sample and determining the desired component concentration, produces a control signal responsive to the difference between the measured light key component concentration and its desired (setpoint) value. The composition of the vapor in chamber 25 is maintained through the operation of analyzer/controller 90 which manipulates the setpoint of level controller 87. By manipulation of the liquid level in chamber 25 and thereby the hydrostatic head on tray 85, the flow of stripping vapor into chamber 6 is varied to obtain the desired concentration of light key component in the vapor in chamber 25.

A level sensor/controller 92 is operably connected to the column 2 at chamber 26 to measure the level therein and produce a control signal responsive to the difference between the measured liquid level in the chamber 26 and its desired (setpoint) value. A conduit 93 opens into the chamber 26 and discharges into the lower region of the column 2 below the tray 85 providing a liquid downflow conduit. The conduit 93 has connected therein a valve 94 which is operably connected to the level controller 92. The signal produced by the level controller 92 is transmitted to the valve 94 to manipulate the valve 94 and thereby to control the level of liquid within chamber 26 by discharge of liquid through the conduit 93. By controlling the level of liquid in chamber 26 the amount of stripping vapor from the bottom region of the column passing into the chamber 7 is controlled. The relative flow rates of vapor passing into the zones 6 and 7 are controlled by varying the relative heights of liquid in the respective chambers 25 and 26. Changing the head in one of the chambers 25 and 26 will simultaneously change the flow rates of vapor passing through the other chamber. For example, if the liquid level height is raised in chamber 25 then an increase in vapor flow will be realized through chamber 26 into the chamber 7 if the level in the zone 26 is maintained the same as before the change in the liquid level height in the chamber 25.

The following calculated example uses a simplified feed composition consisting only of the aromatics; benzene, toluene and o-xylene, and is illustrative of the utility of the invention.

EXAMPLE

A fractionator is a 58-tray column operating at 35 psia (0.24 MPa). The internal partition separating the feed side and side draw side extends from the 11th to the 48th trays. Feed is introduced as a liquid at 275° F. (135° C.) on the 26th tray and side draw product is removed from the 31st tray on the other side of the column partition. Top tray temperature is 237° F. (114° C.), tray 48 temperature is 257° F. (125° C.), tray 31 temperature is 307° F. (153° C.), tray 11 temperature is 354° F. (179° C.) and reboiler temperature is 382° F. (194° C.). The feed and product compositions and flow rates are shown on the following material balance along with flow rates for some other intermediate streams.

It may be noted from the flow rates presented that the vapor flow rate/liquid flow rate ratio for the feed side of the partitioned section at the bottom of the section is only 0.73 (14,290 kg. mols/D/19,561 kg. mols/D) as compared with 1.38 (11,169 kg. mols/D/8,118 kg. mols/D) for the side draw side, indicating the widely different separation factors required for the two sides of the column.

| Material Balance, kg Mols/Day | | | | |
|---|---|---|---|---|
| | Feed | Overhead Product | Sidedraw Product | Bottom Product |
| Benzene | 7,500 | 7,487 | 13 | — |
| Toluene | 5,000 | 11 | 4,980 | 9 |
| Xylene | 2,500 | — | 7 | 2,493 |
| Totals | 15,000 | 7,498 | 5,000 | 2,502 |

| | kg Mols/Day |
|---|---|
| Reflux to Column | 18,000 |
| Reflux to Feed Side of Partition | 5,308 |
| Reflux to Sidedraw Side of Partition | 13,987 |
| Vapor to Feed Side of Partition | 14,290 |
| Vapor to Sidedraw Side of Partition | 11,169 |
| Liquid from Feed Side of Partition | 19,561 |
| Vapor from Feed Side of Partition | 15,040 |
| Reboiler Vapor | 26,149 |
| Liquid from Sidedraw Side of Partition | 8,118 |

It is to be understood that while there has been illustrated and described certain forms of this invention, it is not to be limited to the specific form or arrangement of parts herein described and shown except to the extent that such limitations are found in the claims.

What is claimed and desired to be secured by Letters Patent is:

1. A fractionation apparatus comprising:
   a fractionation column;
   a plurality of spaced apart vapor-liquid contacting trays in said column extending from a region near the bottom of the column to a region near the top of the column;
   a first inlet means communicating with the column at an intermediate region of the column to introduce a feedstream;
   a first outlet means communicating with the column adjacent the top of the column for the removal of vapor;
   a second outlet means communicating with the column adjacent the bottom of the column for the removal of bottoms;
   a third outlet means communicating with the column adjacent an intermediate region of the column for withdrawing a side product, said third outlet means being laterally spaced on the column from said first inlet means;
   a partition mounted in said column and extending generally vertically, said partition having opposite sides and dividing a central region of the column into first and second chambers with said first chamber being on one side of said partition and the second chamber being on the other side of said partition, said first inlet means opening into said first chamber and said third outlet means opening into the second chamber, said partition having an upper end and a lower end with said lower end being above at least one of said trays;
   first liquid reservoir means in said column positioned above the upper end of said partition operable for collecting and storing liquid;
   first conduit means forming a flow path between opposite sides of said first liquid reservoir means operable for returning collected liquid to at least one of said first and second chambers, at least a portion of said first conduit means being positioned externally of said column;
   first means forming first and second vapor collecting chambers positioned adjacent a lower end of said partition and operable for collecting vapor from the bottom of the column, said first vapor collecting chamber being adjacent a lower portion of said first chamber and said second vapor collecting chamber being adjacent a lower portion of said second chamber, said first means also forming a plurality of downcomers at the lower end of said partition with at least one said downcomer being on each said side of said partition;
   second conduit means communicating with said second vapor collecting chamber operable for discharge of one of vapor and liquid from said second vapor collecting chamber, at least a portion of said second conduit means being positioned externally of said column;
   third conduit means communicating with said first vapor collecting chamber operable for discharge of one of vapor and liquid from said first vapor collecting chamber, at least a portion of said third conduit means being positioned externally of said column.

2. A fractionation apparatus as set forth in claim 1 wherein:
   said partition is imperforate.

3. A fractionation apparatus as set forth in claim 1 wherein said first conduit means includes:
   a first conduit having one end opening into the first liquid reservoir means and another end opening into the first chamber and having a first flow control valve connected therein; and
   a second conduit having one end opening into the first liquid reservoir means and another end opening into the second chamber and having a second flow control valve connected therein.

4. A fractionation apparatus as set forth in claim 3 including:
   a first analyzer operably connected to said first chamber near the top thereof to measure the concentration of a constituent of a fluid mixture being separated and to establish a first signal representative of such concentration;

first control means operably connected to said first analyzer and said first flow control valve responsive to said first signal to control the liquid flow from the first liquid reservoir means to the first chamber;

first liquid level sensing means operably connected to said column adjacent the first liquid reservoir means to measure the liquid level therein and to establish a second signal representative of such liquid level; and second control means operably connected to said first liquid level sensing means and said second flow control valve responsive to said second signal to control the level of liquid in the first liquid reservoir means.

5. A fractionation apparatus as set forth in claim 4 including:

a second analyzer operably connected to said first chamber near the bottom thereof to measure the concentration of a constituent of a fluid mixture being separated and to establish a second signal representative of such signal;

third control means operably connected to said third conduit means responsive to said second signal to control vapor flow from the first vapor collecting chamber to the first chamber, said third conduit means communicating with said first chamber and forming a flow path between said first vapor collecting chamber and first chamber; and fourth control means operably connected to said second conduit means responsive to said second signal to control vapor flow from the second vapor collecting chamber to the second chamber, said second conduit means communicating with said second chamber forming a flow path between said second vapor collecting chamber and said second chamber.

6. A fractionation apparatus as set forth in claim 1 including:

an analyzer operably connected to said first chamber near the bottom thereof to measure the concentration of a constituent of a fluid mixture being separated and to establish a signal representative of such concentration;

a control means operably connected to said third conduit means responsive to said signal to control vapor flow from the first vapor collecting chamber to the first chamber, said third conduit communicating with said first chamber and forming a flow path between said first vapor collecting chamber and first chamber; and communicating with said first chamber and forming a flow path between said first vapor collecting chamber and first chamber; and a second control means operably connected to said second conduit means responsive to said signal to control vapor flow from the second vapor collecting chamber to the second chamber, said second conduit means communicating with said second chamber and forming a flow path between said second vapor collecting chamber and said second chamber.

7. A fractionation apparatus as set forth in claim 1 wherein said first means includes:

a vapor-liquid contacting tray below the lower end of said partition;

first and second top members positioned above respective first and second portions of the bubble tray and forming tops of respective said first and second vapor collecting chambers; and first and second members each cooperating with a respective said first and second top member forming first and second downcomers each in a respective said first chamber and second chamber, said first and second members each partially defining a respective said first vapor collecting chamber and second vapor collecting chamber.

8. A fractionation apparatus as set forth in claim 7 wherein:

said first and second top members are perforate.

9. A fractionation apparatus as set forth in claim 7 including:

an analyzer operably connected to said first chamber near the bottom thereof to measure the concentration of a constituent of a fluid mixture being separated and to establish a concentration representative of such signal;

first control means operably connected to said first vapor collecting chamber, said third conduit means and said analyzer and responsive to said signal to control the level of liquid in said first vapor collecting chamber; and second control means operably connected to said second vapor collecting chamber and second conduit means to control the level of liquid in said second vapor collecting chamber.

10. A fractionation apparatus including:

a fractionation column having a plurality of vapor-liquid contacting trays therein extending from a region near the bottom of the column to a region near the top of the column;

a first inlet at an intermediate region of the column operable to introduce a feed stream;

a first outlet at the top of the column for the removal of overhead vapor;

a second outlet at the bottom of the column for the withdrawal of kettle product;

a third outlet at an intermediate region of the column to withdraw a side product, said third outlet being spaced laterally on the column from said first outlet;

a partition extending vertically in the column to divide the central region thereof into first and second chambers, said first inlet opening into said first chamber and said third outlet opening into said second chamber, the top of said partition being below the uppermost contacting tray in the column and the bottom of said partition being above the lowermost contacting tray in the column;

a first analyzer connected to said first chamber near the bottom thereof to measure the concentration of a constituent of a fluid mixture being separated and to establish a signal representative of such concentration; and first control means responsive to said signal to control the relative vapor and liquid flows between the bottoms of said first and second chambers and the region of said column below said partition.

11. A fractionation apparatus as set forth in claim 10 including:

a second analyzer operably connected to said first chamber near the top thereof to measure the concentration of a constituent of a fluid mixture being separated and to establish a second signal representative of such concentration;

second control means operably connected to said second analyzer and being responsive to said second signal to control liquid flow from an upper portion of the column to the first chamber;

first liquid level sensing means operably connected to said column adjacent the upper portion of the column and operable to measure liquid level therein and to establish a second signal representative of such liquid level; and third control means operably connected to said first liquid level sensing means and responsive to said second signal to control the level of liquid in the upper portion of the column.

12. A method of separating a fluid mixture including first, second and third constituents having different boiling points, the boiling point of the first being the lowest and the boiling point of the third being the highest, which method comprises:

introducing said mixture into an intermediate region of a fractionation column which contains vapor-liquid contacting trays extending through a substantial height of the column, said column being provided with a generally vertical partition which divides the central region of the column into first and second zones, there being contacting trays in said column above and below said zones, said mixture being introduced into said first zone;

operating said column to withdraw from the top of the column a stream rich in the first constituent, to withdraw from the bottom of the column a stream rich in the third constituent and to withdraw from an intermediate region of the second zone a stream rich in the second constituent;

measuring the concentration of the first constituent in the lower region of the first zone;

flowing vapor and liquid between the lower regions of the first and second zones and a region of said column below said partition; and controlling the relative vapor and liquid flows between the lower regions of said first and second zones and the region of said column below said partition in response to the measured concentration of the first constituent.

13. A method as set forth in claim 12 including:

measuring the concentration of the third constituent in the upper region of the first zone;

flowing vapor and liquid between the upper regions of the first and second zones and a region of said column above said partition; and controlling the liquid flows to the upper regions of said first and second zones from the region of said column above said partition in response to the measured concentration of the third constituent.

14. A method as set forth in claim 13 including:

collecting liquid below the lower regions of said first and second zones in first and second vapor collecting zones; and controlling the liquid levels in the first and second vapor collecting zones to effect control of the relative vapor and liquid flows between the lower regions of said first and second zones and the region of the column below said partition.

15. A method as set forth in claim 14 wherein:

the controlling of the relative vapor and liquid flows is accomplished by analyzing a mixture of fluids adjacent the bottom of the first zone and generating a signal representative of the concentration of the first constituent and controlling at least one of the liquid levels in response to said signal.

16. A method as set forth in claim 12 wherein:

the controlling of the relative vapor and liquid flows is accomplished by analyzing a mixture of fluids adjacent the bottom of the first zone and generating a signal representative of the concentration of the first constituent and controlling the vapor flow rates from first and second vapor collecting zones, below said first and second zones, to respective said first and second zones, in response to said signal.

* * * * *

UNITED STATES PATENT AND TRADEMARK OFFICE
CERTIFICATE OF CORRECTION

PATENT NO. : 4,230,533

DATED : Oct. 28, 1980

INVENTOR(S) : Victor A. Giroux

It is certified that error appears in the above-identified patent and that said Letters Patent is hereby corrected as shown below:

Column 9, line 39, before "forming" insert --- and ---;
Column 12, line 22, "liguid" should read --- liquid ---.

Signed and Sealed this

Fifteenth Day of September, 1987

Attest:

DONALD J. QUIGG

Attesting Officer

Commissioner of Patents and Trademarks